No. 780,039. PATENTED JAN. 17, 1905.
F. M. HURLEY.
ANCHORING STAKE.
APPLICATION FILED APR. 1, 1904.
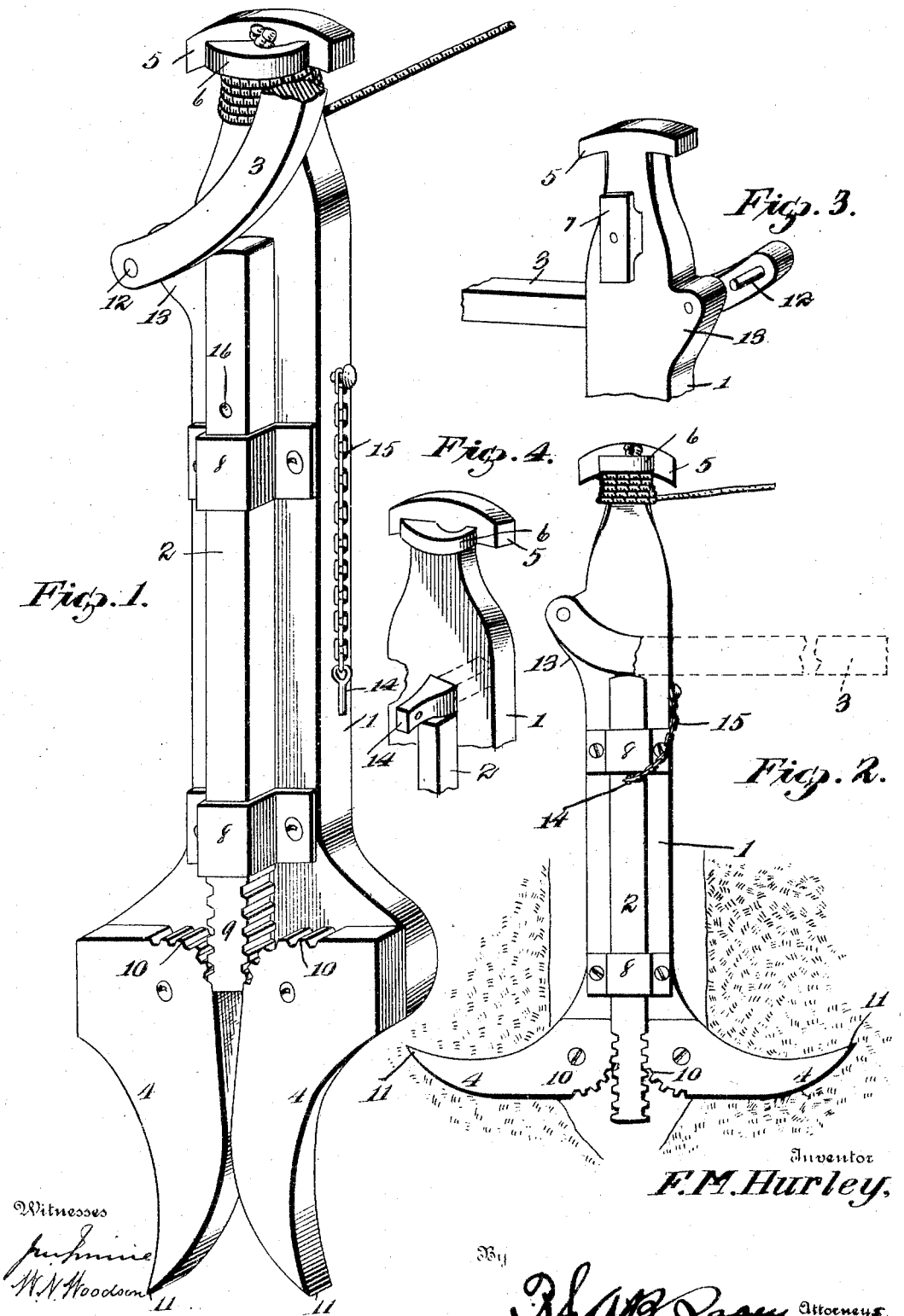
Witnesses
Inventor
F. M. Hurley,
By
Attorneys No. 780,039. Patented January 17, 1905.

UNITED STATES PATENT OFFICE.

FRANK M. HURLEY, OF ATHENS, OHIO.

ANCHORING-STAKE.

SPECIFICATION forming part of Letters Patent No. 780,039, dated January 17, 1905.

Application filed April 1, 1904. Serial No. 201,175.

*To all whom it may concern:*

Be it known that I, FRANK M. HURLEY, a citizen of the United States, residing at Athens, in the county of Athens and State of Ohio, have invented certain new and useful Improvements in Anchoring-Stakes, of which the following is a specification.

This invention relates to improvements in anchoring devices, and is especially adapted for securing tents, derricks, or the like.

The essential object of my invention is to provide a device of the type indicated above which possesses a maximum degree of substantiality and which may be quickly secured in the ground or displaced therefrom without the delay and inconvenience incident to the various means now most commonly used.

For a full description of the invention and merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of my invention, showing the relative positions of the parts preparatory to placing the stake in the ground. Fig. 2 is a vertical sectional view showing the stake after same has been secured in the ground, the operating-lever by which the actuating-bar is actuated being shown in dotted lines. Fig. 3 is a broken perspective view showing the upper portion of the stake and the end of the operating-lever adjacent thereto. Fig. 4 is a view showing the stop-pin 14 above the upper end of the actuating-bar engaging same to prevent movement thereof.

Corresponding and like parts are referred to in the following description and indicated in all the views of the drawings by the same reference characters.

My anchoring device consists principally of five parts—namely, a stake 1, an actuating-bar 2, an operating-lever 3, and a pair of anchoring-dogs 4. The stake 1 may be of any suitable form so far as its general structure is concerned, being made with a view to strength and rigidity, however. At the upper end of the stake 1 a head 5 is provided, and securing members 6 are also mounted upon the head portion or adjacent thereto for the purpose of attaching guy-ropes or tackle of any suitable sort.

Guide members 8 are secured to a side of the stake-body 1, and these guide members receive the actuating-bar 2 and direct the latter in its sliding movement upon the stake 1. The lower portion of the actuating-bar 2 is provided with a plurality of teeth 9 upon opposite sides thereof, and these teeth 9 coöperate with toothed segments 10, formed upon the anchoring-dogs 4. The dogs 4 are pivoted at points adjacent the segments 10 thereof to the lower end portion of the stake 1, and these dogs are adapted by a pivotal movement to be projected laterally from the stake, so as to enter the ground to secure the stake in position. To facilitate the lateral anchoring movement of the dogs 4, the upper ends thereof are pointed, preferably as shown at 11.

The means for actuating the bar 2 comprises an operating-lever 3, before mentioned, and this lever is removably mounted upon the stake 1. The lever 3 is provided with a pivot member 12, extended laterally therefrom and disposed at one end thereof. The upper portion of the stake 1 is provided with a lateral enlargement 13, which is provided with an opening to receive the pivot member 12 of the operating-lever 3 when the latter is disposed upon the stake. The lever 3 is curved adjacent the point of pivotal support thereof and may be of a size and length suitable for the purposes for which the anchoring device may be specially utilized. The size of the lever 3 would greatly depend upon the general size of the stake and adjacent coöperating parts. The lever 3 is adapted to engage the upper end of the actuating-bar, and downward movement of the lever 3 is adapted to thereby force the actuating-bar downwardly in a manner which will be readily comprehended. The sliding downward movement of the actuating-bar 2 imparts a pivotal movement to the dogs 4 because of the engaging relation between the teeth 9 of the bar 2 and the toothed segments 10 of the dogs 4. The pivotal movement imparted to the dogs 4 projects said dogs laterally from the stake to form anchoring members which effectually prevent any displacement of the stake while they are so disposed.

To lock the actuating-bar 2 positively from upward movement after the same has been forced downwardly by the lever 3, a stop-pin 14 is carried by the stake 1, being suspended therefrom by means of a flexible connection, such as a chain 15. The stop-pin 14 is adapted to be passed through openings 16, which are provided in the body of the stake and in the actuating-bar 2, said openings being adapted to register when the actuating-bar reaches the limit of its downward movement.

In the use of the anchoring device a hole is first made in the ground of a size sufficient to receive the stake 1. The said stake is then introduced into the hole and the operating-lever 3 is disposed upon the upper portion of the stake and caused to actuate the bar 2. The actuation of the bar 2 projects the anchoring-dogs 4 outwardly from the stake, and this having been done the stop-pin 14 is placed in position to lock the anchoring-dogs projected from the stake. The operating-lever 3 may then be removed, and the operator will then pass on to the next stake and use this same lever in positioning the latter-mentioned stake.

Fig. 4 illustrates the stop-pin 14 in engagement with the upper end of the actuating-bar 22 instead of passing through the opening in the actuating-bar, as shown in Fig. 2. The coöperation of the stop-pin in Fig. 4 is substantially the same, however.

Having thus described the invention, what is claimed as new is—

1. In combination, an anchoring-stake, an actuating-bar disposed upon the said stake, anchoring-dogs carried by the stake and coöperating with the actuating-bar, and a lever mounted upon the stake and adapted to actuate the actuating-bar.

2. In combination, an anchoring-stake, an actuating-bar disposed upon the said stake, anchoring-dogs carried by the stake and coöperating with the actuating-bar, and a removable lever mounted upon the stake and adapted to actuate the actuating-bar.

3. In combination, a stake, anchoring-dogs pivoted to the stake and provided with toothed segments, an actuating-bar slidably mounted upon the stake and provided with teeth meshing with segments of the anchoring-dogs, and means for actuating said bar.

4. In combination, a stake, anchoring-dogs pivoted to the lower portion of the stake, toothed segments formed with said dogs adjacent the pivoted portions thereof, an actuating-bar slidably mounted upon the stake and provided at its lower end with oppositely-disposed teeth meshing with the toothed segments of the anchoring-dogs, and means for locking the actuating-bar from movement.

5. In combination, a stake, guide members projected laterally from the stake, an actuating-bar slidably mounted in said guide members and provided at its lower end with oppositely-disposed teeth, anchoring-dogs pivoted to the lower end of the stake and provided with toothed segments meshing with the teeth of the actuating-bar, a lever pivoted to the upper portion of the stake and engaging the upper end of the actuating-bar, and a stop-pin adapted to pass through openings in the stake and actuating-bar to lock the latter from movement.

In testimony whereof I affix my signature in presence of two witnesses.

FRANK M. HURLEY. [L. S.]

Witnesses:
J. R. HONNALD,
HOWARD BROOKS.